United States Patent [19]

Nonaka et al.

[11] 3,781,577

[45] Dec. 25, 1973

[54] PIEZOELECTRIC RESONATOR

[75] Inventors: Shunsuke Nonaka; Tasuku Yuuki; Kouichi Hara, all of Tokyo, Japan

[73] Assignee: Nippon Electric Company, Limited, Tokyo, Japan

[22] Filed: Aug. 25, 1971

[21] Appl. No.: 174,894

[30] Foreign Application Priority Data

Aug. 28, 1970 Japan .............................. 45/75403

[52] U.S. Cl. .................................. 310/9.7, 310/9.5
[51] Int. Cl. .......................................... H04r 17/00
[58] Field of Search ...................... 310/8.2, 9.5, 9.7, 310/9.8

[56] References Cited

UNITED STATES PATENTS 3,165,651 1/1965 Bechmann .......................... 310/9.7

3,165,651 1/1965 Bechmann .......................... 310/9.7

*Primary Examiner*—J. D. Miller
*Assistant Examiner*—Mark O. Budd
*Attorney*—Louis E. Marn et al.

[57] ABSTRACT

A piezoelectric resonator including a thickness shear piezoelectric element having an electrode on each face thereof, one electrode formed with two apertures spaced in the region of largest expansion and contraction on the geometrical axis in the shearing direction of the element where amplitude vibration is a maximum.

1 Claim, 7 Drawing Figures

PIEZOELECTRIC RESONATOR

The present invention relates to a piezoelectric resonator of a thickness shear vibration mode, wherein parts of metal film electrodes are removed in order to keep the series resonance resistance of the resonator low, and to avoid the adverse effect of the electrode film on the resonance frequency.

The conventional metal film electrodes have been attached to practically the whole of the surface of the resonator at which amplitude vibration is present, thereby to raising the mechanical-electrical energy conversion efficiency. With this type of electrodes, however, the vibration loss within the electrode films is large, and the variation in the internal stress within the electrode films affects the stability of vibration frequency. Therefore, in order to avoid these disadvantages, the electrode films are attached to a small amplitude vibration portion of the resonator in recent proposals. For example, annular ring electrodes are employed for the above-mentioned reason. The annular ring electrodes are detailed in a paper entitled "High Q Crystal Units" by W. Ianouchevsky (Proceedings of 17th Annual Symposium on Frequency Control May, 1963). With the annular ring electrodes, however, the gain of an oscillator should be increased, because the series resonance resistance becomes high. Also, the difference between the series-resonance frequency and the paralle-resonance frequency becomes small, so that when this resonator is used in an oscillator, the adjustable frequency range is narrowed.

An object of the present invention is therefore to provide a piezoelectric resonator wherein the above-mentioned disadvantages are eliminated, the adverse effect of the electrode films on the resonance frequencies is small, and yet, the series resonance resistance is low, and the difference between the series-resonance frequency and the parallel-resonance frequency is large.

The piezoelectric resonator according to the present invention comprises a thickness shear piezoelectric resonator and electrode films attached to said piezoelectric resonator, and is characterized in that at least one of said electrode films is attached to that portion of the resonator element which does not include a part where the expansion and contraction of the piezoelectric resonator is the largest, and which includes a part of the maximum amplitude vibration on a geometrical central axis in the shearing direction of the piezoelectric resonator.

The piezoelectric resonator according to the present invention is hereinafter described in detail referring to the accompanying drawings, wherein.

Figure 1:
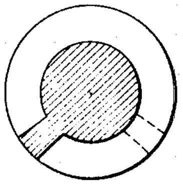
FIG. 1 shows a plan view of a circular thickness shear resonator having electrode films of a conventional form.
Figure 2:
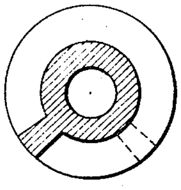
FIG. 2 shows a plan view of a circular thickness shear resonator having annular ring electrodes.
Figure 3:
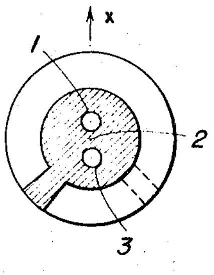
FIG. 3 shows a plan view of an embodiment of a piezoelectric resonator according to the present invention.
Figure 4:
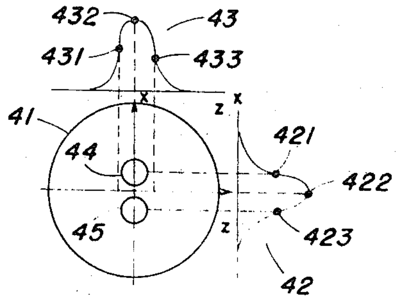
FIG. 4 illustrates a plan view of a circular thickness shear resonator and characteristic diagrams showing vibrational-displacement distributions.

The piezoelectric resonator in accordance with the present invention as a construction as shown, by way of example, in FIG. 3. As illustrated in FIG. 4, in the thickness shear vibration mode, the vibration energy is concentrated on the central part. Therefore, according to the arrangement of electrodes as shown in FIG. 1, the energy conversion efficiency is large and the series resonance resistance may be accordingly made low. As is well known, since the electrodes as shown in FIG. 1 are applied to those large amplitude vibration portions of the resonator, the difference between the series-resonance frequency and the parallel-resonance frequency is large, and thus the adjustment of the oscillation frequency is also easy. With this type of electrodes, however, the vibration loss within the electrode films is large, and accordingly, the adverse effect of physical and/or chemical changes of the electrode films upon the oscillation frequency is also large. On the contrary, the resonator with the annular ring electrodes as shown in FIG. 2 has the difficulty of the adjustment of the resonance frequency of the resonator, although the adverse effect of electrode films upon the frequency stability may be made small. Moreover, since the difference between the series-resonance frequency and the parallel-resonance frequency is small, the frequency adjustment width of an oscillator which employs the resonator unit is narrow. In addition, since the electro-mechanical conversion efficiency is poor and the series resonance resistance is high, the design of an oscillator circuit has been difficult.

In contrast, with the resonator having electrode films as illustrated in FIG. 3, the electrode film is not applied to parts 1 and 3 where the vibration loss or the frictional loss due to vibrations between the electrode film and the resonator surface is the largest. Therefore, the "Q" of the resonator may be made high. Nevertheless, since the resonator has the electrode film at a part 2 at which the amplitude vibration is the largest (the maximum displacement point), the series resonance resistance may be made low. Furthermore, the adjustment of the resonance frequencies is easily carried out by changing the thickness of the comparatively wide electrode film.

The above-mentioned reasons will now be described in detail with reference to FIG. 4. For example, the amplitude of vibration of a circular thickness shear resonator 41 is as shown by curves 42 and 43 in the shearing direction (X-direction crystal axis) and in a direction perpendicular to the shearing direcion (Z-direction), respectively. The adverse effect of the electrode films on the vibrational loss and the resonance frequencies is maximum at those portions of the resonator where the expansion and contraction of the electrode film is extremely forced in the distribution of displacement, i.e., at portions 421 and 423, where the gradient of the displacement distribution is in the maximum. The effects of those portions 422, 431, 432 and 433 where the expansion and contraction of the electrode film is small are maintained small. Accordingly, in a resonator with the parts 44 and 45 removed, Q can be made large and the frequency stability which tends to be affected by the electrode film can be reduced, without deteriorating the series resonance resistance and without decreasing the difference between the series-resonance frequency and the parallel-resonance frequency.

The dimension and other data of the resonators of FIGS. 1 to 3 are shown by way of example in the following table.

| | Diameter of the removed portion(s) (mmφ) | Variable range of frequency (Hz) | Frequency Deviation due to aging (Δf/f per day) |
|---|---|---|---|
| FIG. 1 | zero | 550 | $(0.5\sim1.0) \times 10^{-9}$ |
| FIG. 2 | 4.0 | 70 | $(0.2\sim0.5) \times 10^{-9}$ |
| FIG. 3 | 1.6 (×2) | 280 | $(0.2\sim0.5) \times 10^{-9}$ |

Diameter and thickness of each resonator are 15 mm and 0.32 mm, respectively, and the center frequency of the oscillator employing each resonator is set at 5 MHz.

Figure 5:
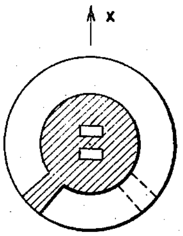
FIGS. 5, 6 and 7 show plan views of further embodiments of the present invention.
Figure 6:
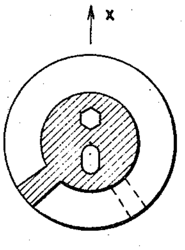
Figure 7:
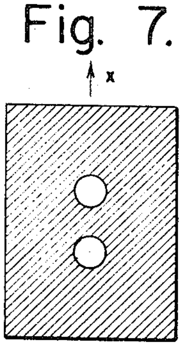

The shapes of the electrodes according to this invention are not restricted to those of FIG. 3. Those shown in FIGS. 5 and 6 may also produce the same effect. Not only in the circular resonator, but also in a square one, the same result is achieved when the electrode is not applied to those portions of the resonator where the expansion and contraction of a vibrator surface is large as is illustrated in FIG. 7. Further, the removal of the electrode film is not restricted to two portions. 6

What is claimed is:

1. A piezoelectric resonator including a thickness shear piezoelectric element having an electrode on each face thereof, one electrode formed with apertures in the region of largest expansion and contraction on the geometrical axis in the shearing direction of said element where amplitude vibration is a maximum.

* * * * *